US006527812B1

(12) United States Patent
Bradstreet

(10) Patent No.: US 6,527,812 B1
(45) Date of Patent: Mar. 4, 2003

(54) METHOD AND SYSTEM FOR UNDOING MULTIPLE EDITING OPERATIONS

(75) Inventor: John Bradstreet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/216,643

(22) Filed: Dec. 17, 1998

(51) Int. Cl.[7] .......................... G06F 15/00; G06F 17/21; G06F 17/00
(52) U.S. Cl. ...................... 715/530; 715/515; 715/531; 345/810; 345/833
(58) Field of Search ............................... 707/530, 515, 707/531; 345/666, 833; 717/113

(56) References Cited

U.S. PATENT DOCUMENTS

| | | | | |
|---|---|---|---|---|
| 5,644,692 A | * | 7/1997 | Eick | 345/833 |
| 5,802,380 A | * | 9/1998 | Bangs et al. | 707/515 |
| 5,835,086 A | | 11/1998 | Bradstreet et al. | 345/581 |
| 5,990,906 A | * | 11/1999 | Hudson et al. | 345/666 |
| 6,026,233 A | * | 2/2000 | Shulman et al. | 717/113 |
| 6,026,416 A | * | 2/2000 | Kanerva et al. | 707/515 |
| 6,111,575 A | * | 8/2000 | Martinez et al. | 345/810 |
| 6,185,591 B1 | * | 2/2001 | Baker et al. | 707/531 |

OTHER PUBLICATIONS

WordPerfect, Version 6.1 for Windows, Apr. 15, 1996 Corel Corporation, screenshots pp. 1–15.*
Ulead PhotoImpact 3.0 User Guide, Ulead Systems, Inc., Jan. 1996, pp. 81–82, 115–123.*
Kurlander, D. et al., Editable graphical histories, IEEE Visual Languages, Oct. 10–12, 1988, pp. 127–134.*
Meng, Chii et al., Visualizing histories for selective undo and redo, IEEE Computer Human Interaction, Jul. 15–17, 1998, pp. 459–464.*
Blinn, James F., "Jim Blinn's Corner: Compositing Part 1: Theory", *IEEE Computer Graphics & Applications*, Sep. 1994, pp. 83–87.
Blinn, James F., "Jim Blinn's Corner: Compositing Part 2: Practice", *IEEE Computer Graphics and Applications*, Nov. 1994, pp 78–82.
Porter, Thomas et al., "Compositing Digital Images", *Proceedings of Siggraph '84*, Association for Computing Machinery, 1984, pp. 49–55.
Shantzis, Michael A., "A Model for Efficient and Flexible Image Computing", *Computer Graphics Proceedings, Annual Conference Series*, 1994, Association for Computing Machinery, 1994, pp. 147–154.
Smith, Alvy, "The ΔΓ∂s of Digital Media Coverage", *Proceedings Graphics Interface '98*, Jun. 18–20, 1998, pp. 51–56.
Smith, Alvy, "The Stuff of Dreams", *Computer Graphics World*, Jul. 1998, pp. 27–29.
Smith, Alvy "Image Compositing Fundamentals" Microsoft Technical Memo 4, Aug. 15, 1995.
Smith, Alvy, "Alpha and the History of Digital Compositing", Microsoft Technical Memo 7, Aug. 15, 1995.

* cited by examiner

*Primary Examiner*—Joseph H. Feild
*Assistant Examiner*—William L. Bashore
(74) *Attorney, Agent, or Firm*—Leydig, Voit & Mayer, Ltd.

(57) ABSTRACT

A method and system for undoing interactive editing operations enables efficient undoing of multiple non-invertable editing operations such as digital painting strokes. During the editing process, a plurality of prior states of the data object being edited at uneven intervals are stored. To undo an editing operation, the object being edited is restored to a stored prior state that came before the operation to be undone was performed. Previously performed editing operations between the restored state and the operation to be undone are then reapplied to the data object to recreate the state of the object right before the operation to be undone was performed. A balance between the speed of the multiple-undo operation and the amount of memory required to store selected prior states is achieved by storing prior states at intervals that increase generally exponentially with a base of two. An efficient mechanism is provided for updating the list of stored prior states during the editing process.

20 Claims, 9 Drawing Sheets

STACK OF STROKE NUMBERS OF STORED STATES

| STROKE NUMBER | S(0) | S(1) | S(2) | S(3) | S(4) |
|---|---|---|---|---|---|
| 0 | | | | | |
| 1 | 0 | | | | |
| 2 | 1 | 0 | | | |
| 3 | 2 | 0 | | | |
| 4 | 3 | 2 | 0 | | |
| 5 | 4 | 2 | 0 | | |
| 6 | 5 | 4 | 0 | | |
| 7 | 6 | 4 | 0 | | |
| 8 | 7 | 6 | 4 | 0 | |
| 9 | 8 | 6 | 4 | 0 | |
| 10 | 9 | 8 | 4 | 0 | |
| 11 | 10 | 8 | 4 | 0 | |
| 12 | 11 | 10 | 8 | 0 | |
| 13 | 12 | 10 | 8 | 0 | |
| 14 | 13 | 12 | 8 | 0 | |
| 15 | 14 | 12 | 8 | 0 | |
| 16 | 15 | 14 | 12 | 8 | 0 |
| 17 | 16 | 14 | 12 | 8 | 0 |
| 18 | 17 | 16 | 12 | 8 | 0 |
| 19 | 18 | 16 | 12 | 8 | 0 |
| 20 | 19 | 18 | 16 | 8 | 0 |

FIG. 9

STACK OF STROKE NUMBERS OF STORED PRIOR STATES STATES

| No. of Strokes Undone | Stroke Number of Current State | S(0) | S(1) | S(2) | S(3) | S(4) | Number of Reapplied Strokes |
|---|---|---|---|---|---|---|---|
| 0 | 20 | 19 | 18 | 16 | 8 | 0 | 0 |
| 1 | 19 | 18 | 16 | 8 | 0 | | 0 |
| 2 | 18 | 16 | 8 | 0 | | | 0 |
| 3 | 17 | 16 | 8 | 0 | | | 1 |
| 4 | 16 | 8 | 0 | | | | 0 |
| 5 | 15 | 14 | 12 | 8 | 0 | | 7 |
| 6 | 14 | 12 | 8 | 0 | | | 0 |
| 7 | 13 | 12 | 8 | 0 | | | 1 |
| 8 | 12 | 8 | 0 | | | | 0 |
| 9 | 11 | 10 | 8 | 0 | | | 3 |
| 10 | 10 | 8 | 0 | | | | 0 |
| 11 | 9 | 8 | 0 | | | | 1 |
| 12 | 8 | 0 | | | | | 0 |
| 13 | 7 | 6 | 4 | 0 | | | 7 |
| 14 | 6 | 4 | 0 | | | | 0 |
| 15 | 5 | 4 | 0 | | | | 1 |
| 16 | 4 | 0 | | | | | 0 |
| 17 | 3 | 2 | 0 | | | | 3 |
| 18 | 2 | 0 | | | | | 0 |
| 19 | 1 | 0 | | | | | 1 |
| 20 | 0 | 0 | | | | | 0 |

FIG. 11  Total reapplied strokes: 25

METHOD AND SYSTEM FOR UNDOING MULTIPLE EDITING OPERATIONS

FIELD OF THE INVENTION

This invention relates generally to interactive data editing, and more particularly to the undoing of editing operations performed on a data object.

BACKGROUND OF THE INVENTION

There are many interactive data-editing software applications developed for interactively editing a wide variety of data objects, such as text documents, business charts, engineering drawings, digital pictures and computer graphics, etc. With commonly used interactive data-editing applications, a user modifies a data object by interactively applying consecutive editing operations to the data object. For example, the user of a word processing program edits a text document by typing and deleting words, cutting, pasting, reformatting, etc., and the user of a digital painting program may modify a picture by applying multiple strokes of various digital paintbrushes. Regardless of the types of data object and interactive editing operations involved, the user would from time to time decide that the effects of the last one or few editing steps are not desirable and would want to remove the changes made by those editing steps. To that end, most interactive data-editing applications available nowadays support an "undo" function that restores the data object being edited back to its state right before the last editing steps were performed.

A widely used approach to implement the undo function may be termed the "backward-uncreate" approach. Under this approach, to undo the last editing step, the inverse of the last editing command is applied to the data object to return it to its previous state. This backward-uncreate approach is commonly used in word processing programs to undo editing operations. To enable the undoing of editing operations, the editing commands (e.g., insertion, deletion, cutting, pasting, formatting, etc.) and the corresponding changes (such as the inserted or deleted portions) may be saved in a buffer. Each time the user selects the undo function, the inverse of the last editing operation is applied to the document to recreate its prior state. By way of example, a deletion performed on a document can be undone by reinserting the deleted portion into the document. By selecting the undo function multiple times, the user can undo multiple consecutive editing steps applied to a document.

This backward-uncreate approach, however, cannot be universally used with all types of interactive editing operations. This is because some editing operations are non-invertable, i.e., the prior state cannot be recovered by applying an "inverse" of the editing operation to be undone. An example of such non-invertable editing operation is the application of a digital painting stroke to a digital picture. A digital picture contains a plurality of pixels each having color data defining the color of that pixel. If a digital brush stroke with an opaque color is applied to the picture, the original color data of those pixels of the picture touched by the brush are overwritten by the new color data. The original color data cannot later be recreated from the new color data even though the effects of the brush stroke are known. As a result, the undoing of a digital painting stroke cannot be implemented using the backward-uncreate approach.

The non-invertability of the painting strokes makes it more difficult to implement a satisfactory undo mechanism. Currently, it has been proposed to allow the last painting stroke to be undone quickly by saving the state of the picture right before the last stroke in the memory. When the user elects to undo the last stroke, the picture is simply restored to the saved prior state. Although this mechanism is relatively fast, it can handle only the undoing of the last painting stroke. If the user wants to undo the second last stroke, the picture has to be regenerated stroke by stroke from the very first stroke of the painting session up to the third last stroke. If the third last stroke is then to be undone, the picture will be regenerated again by applying all strokes from the first stroke up to the fourth last stroke. As a result, the multiple-undo operation, i.e., the operation of undoing more than the last editing operation, can be unacceptably slow when the number of existing strokes in the picture is large.

One possible way to improve the speed of the multiple-undo operation is to store the prior states of the picture for the most recent several strokes. A multiple-undo operation can be quickly performed as long as the state to which the picture is to be restored has been stored in the memory. This approach is, however, generally unfavorable. First of all, the depth of this undo mechanism, i.e., the number of consecutive strokes that can efficiently undone, is still limited by the number of the most recent prior states stored in the memory. Moreover, the amount of memory required to store the most recent prior states of the picture can be very large even for a very modest depth of operation.

There is therefore a need for an undo mechanism that can be used to undo multiple non-invertable editing operations, such as digital painting strokes applied by a user of a digital painting program, that is reasonably fast, has a reasonable large depth of operation, and does not impose an unacceptably high demand of memory space.

SUMMARY OF THE INVENTION

In accordance with the invention, there is provided a method and system for undoing multiple editing operations on a data object that provides improved performance in terms of speed, operation depth, and memory required, and can be used in undoing non-invertable editing operations. In the course of the editing process, a plurality of prior states are stored in the memory. The stored prior states correspond to previously performed editing operations that are spaced at uneven and preferably generally exponentially increasing intervals. When an undesired editing operation is to be undone, the data object is first restored to a stored prior state. If that restored state is not the target state (i.e., the state immediately prior to the undesired editing operation), all previously performed editing operations between the restored state and the undesired operation are reapplied to the data object to recreate the target state.

Other advantages will become apparent with reference to the following detailed description when taken in conjunction with the drawings in which:

BRIEF DESCRIPTION OF THE DRAWINGS

FIG. 9 is a table showing the evolution of a stack of stroke numbers of stored prior states of a digital picture as painting strokes are applied to the picture according to an embodiment of the invention;

FIG. 11 is a table showing the evolution of a stack of stroke numbers of stored prior states of a digital picture as multiple painting strokes applied to the picture are undone according to an embodiment of the invention.

Figure 1:
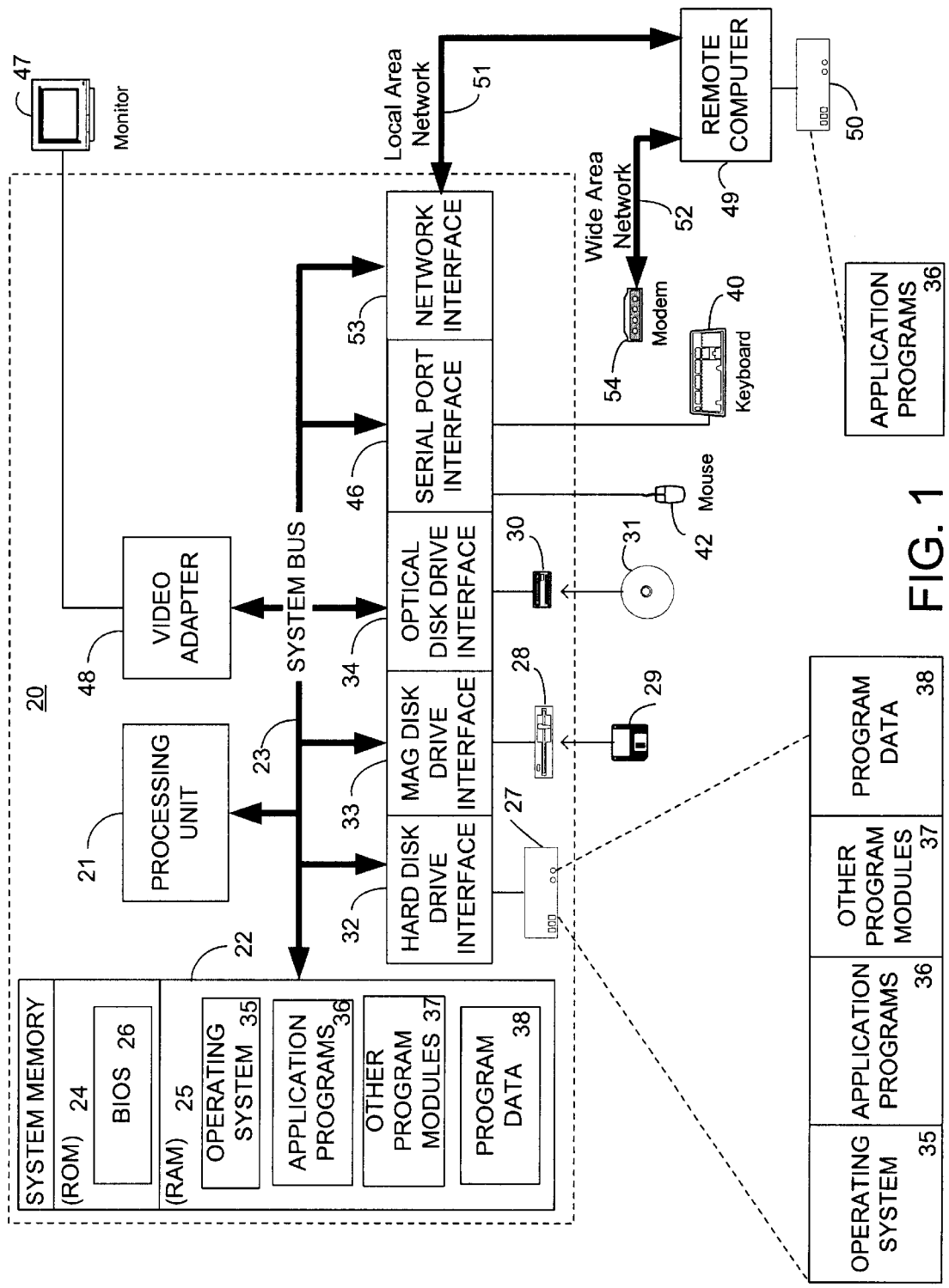
FIG. 1 is a block diagram of a computer system that may be used to implement a method and system for undoing multiple interactive editing operations performed on a data object according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 and the following discussion are intended to provide a brief, general, description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and a pointing device 42, such as a mouse. Other input devices (not shown) may include a microphone, joystick, game pad, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. n addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is directed to a method and system for implementing a mechanism for undoing multiple editing operations performed on a data object. During the editing process, a plurality of consecutive editing operations are applied by a user to the data object. The user may then decide to undo the last one or more editing operations to return the data object to a prior state.

Figure 2:
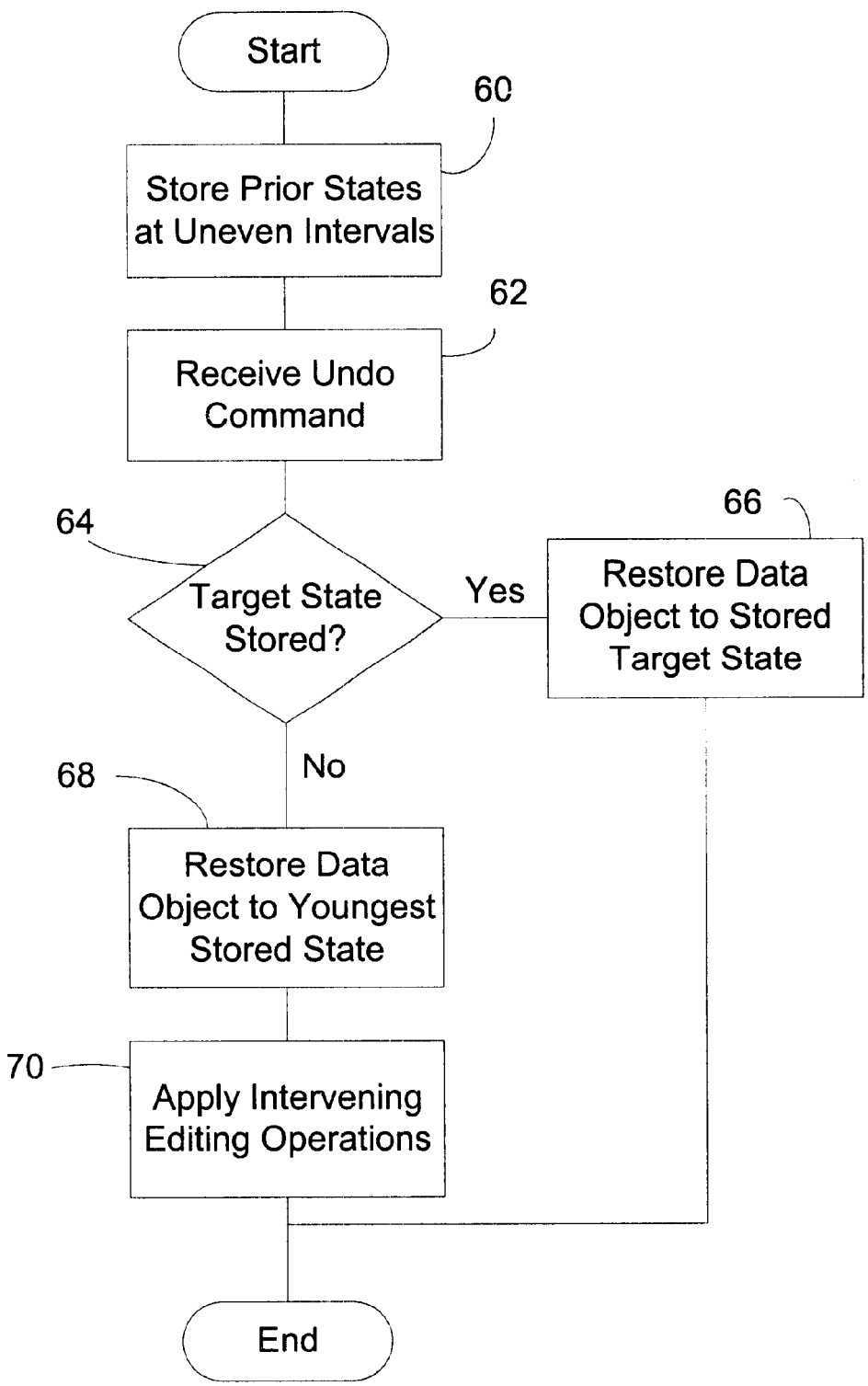
FIG. 2 is a flow chart showing steps of undoing multiple editing operations according to the invention.

Broadly, referring to FIG. 2, during the editing process, a method according to the present invention stores a plurality of prior states of the data object being edited in the memory (step 60). In accordance with a feature of the invention, the stored prior states correspond to respective previously applied editing operations that are not consecutive but are spaced at uneven intervals. The editing operations that have been performed on the data object are also stored in the memory. When the user enters a command to undo an editing operation (step 62), the stored editing operations and the stored prior states are used to return the data object to its state just before the editing operation to be undone was performed. More particularly, if one of the stored prior states is the target state (i.e., the state just prior to the editing operation to be undone) (step 64), the data object is restored to that state using the stored state data (step 66). On the other hand, if the target state is not one of the stored prior states, the data object is restored to the youngest stored prior state (step 68). All previously applied editing operations between the youngest stored prior state and the operation to be undone are then reapplied to the restored data object to recreate the target state (step 70).

Figure 3:
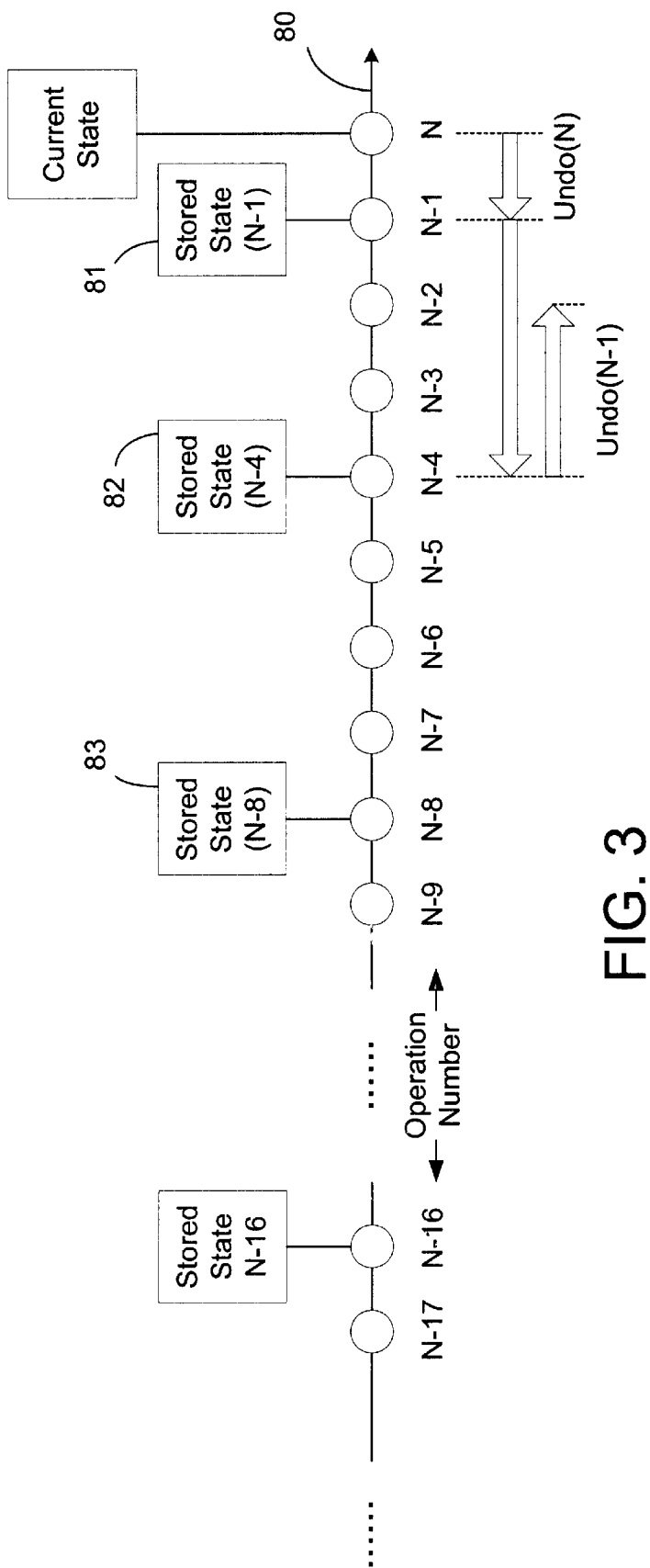
FIG. 3 is a schematic diagram showing the use of multiple stored prior states of a data object being edited in undoing multiple editing operations according to the invention.

By way of example, FIG. 3 shows the timeline 80 of an interactive editing process in which N+1 consecutive editing operations numbered from 0 to N have been performed, and a plurality of prior states of the data object at spaced uneven intervals are stored. In the illustrated example, the stored prior states 81–83 correspond to editing operations with operation numbers N-1, N-4, N-8. If the user enters a command to undo editing operation number N, the data object is simply restored to the stored state 81 for operation number N-1. If, however, the user further enters a command to undo the editing operation N-1, the data object will be first restored to the stored state 82 for the editing operation N-4. This is because the prior state for the editing operation N-2 has not been stored, and the state for the editing operation N-4 is the youngest stored prior state. Subsequently, the editing operations N-3 and N-2 are reapplied to the restored data object to recreate the state corresponding to the editing operation N-2. As will be described in greater detail below, the list of stored prior states is preferably dynamically updated, i.e., some existing stored states are deleted and new states are stored, as more editing operations and undo operations are applied to the data object being edited. The dynamic updating of the list of stored states enables the efficient use of memory space for storing prior states.

In a preferred embodiment, the intervals between the stored prior states generally increase as the stored prior states become further away from the current state of the data object. In a more preferred embodiment, the intervals increase generally exponentially. As will be described in greater detail below, this arrangement has the advantage that a relatively small number of saved prior states is sufficient to support a reasonably large depth of the undo operation.

The undo method of the invention is applicable to many different types of interactive editing processes. For example, the data object being edited may be a text document, and the editing operations may include word-processing operations such as entering and deleting text, cutting, pasting, reformatting, etc. As described above, the undo function in word processing applications is typically implemented under the "backward-uncreate" approach, wherein the inverse of the editing operation to be undone is applied to the data object to return it to its prior state. The undo method of the invention provides an effective alternative for implementing the undo function for such invertable editing operations.

The undo method of the invention is, however, especially advantageous for undoing editing operations that are not invertable, such as the rendering of digital paintbrush strokes to a digital picture. To illustrate its advantageous use in undoing editing operations that are non-invertable, the undo method of the invention will be described below in the context of a digital painting program used by a user to apply strokes of various digital paintbrushes to a digital picture. It will be appreciated, however, that there is no limitation on the specific types of editing operations that can be undone according to the invention, as long as the editing operations and the corresponding states of the data object can be stored.

It will also be appreciated that what constitutes one editing operation depends on the nature of the editing process and design choices made by the software developer. For instance, in a word processing application an editing operation may be the entering of text in a given period of time or the deletion of a selected text block. In a digital painting programs it may be convenient to treat each painting stroke as one editing operation. Alternatively, each editing operation may include only a fraction of a stroke to provide finer granularity of the undo operation.

Figure 4:
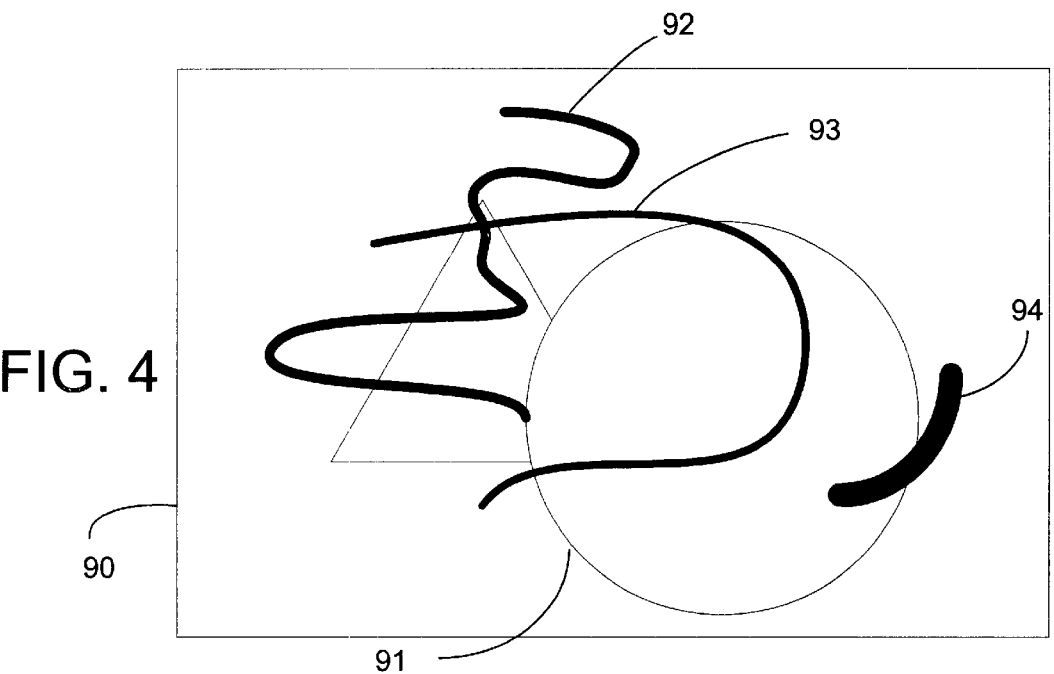
FIG. 4 is a schematic diagram showing a digital picture having multiple painting strokes applied thereto.
Figure 5:
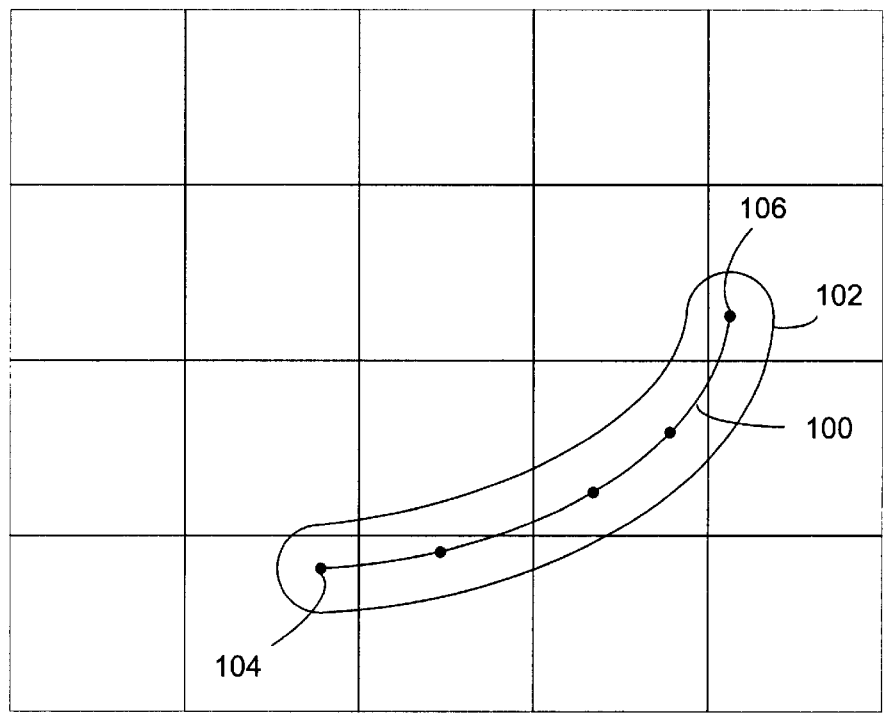
FIG. 5 is a schematic diagram showing a painting stroke applied to a digital picture.

By way of example, FIG. 4 shows a digital picture 90, which includes a background image 91 and a plurality of digital painting strokes 92–94 applied thereto. A variety of digital paintbrushes of different forms and shapes may be used to form the painting strokes, as described in U.S. application Ser. No. 08/979,524, issued as U.S. Pat. No. 5,835,086, which is to the same assignee and hereby incorporated by reference. In a preferred embodiment, each painting stroke constitutes one editing operation. A painting stroke is defined by the attributes of the digital paintbrush used to form the stroke and its trace in the picture. As shown in FIG. 5, the trace 100 of a paintbrush in forming a stroke 102 is defined by a plurality of control points along the trace, including a starting point 104, an end point 106, and a plurality of intermediate points. A data structure for recording painting stroke traces is described in aforementioned U.S. application Ser. No. 08/979,524. Storing painting strokes in the memory enables, among other things, the regeneration of a state of the picture from an earlier state by applying intervening painting strokes to the digital picture.

The state of the picture being edited at a given time is defined by the colors of the pixels in the picture. The color information may be in a commonly used color format, such as the well-known RGBa format where R, G, B, and a stand for red, green, blue, and transparency, respectively. The state of the picture at a given time is stored by storing the color information of the pixels in the memory. It will be appreciated that it may not be necessary to store the color of every pixel in the picture for a given state in order to retain sufficient information for restoring the picture to that given state. For instance, in a preferred embodiment, the digital picture is divided into a plurality of tiles, each tile being 64 pixels high and 64 pixels wide. For a given state, only those tiles that are touched by one or more strokes need to be stored in the memory.

Figure 6:
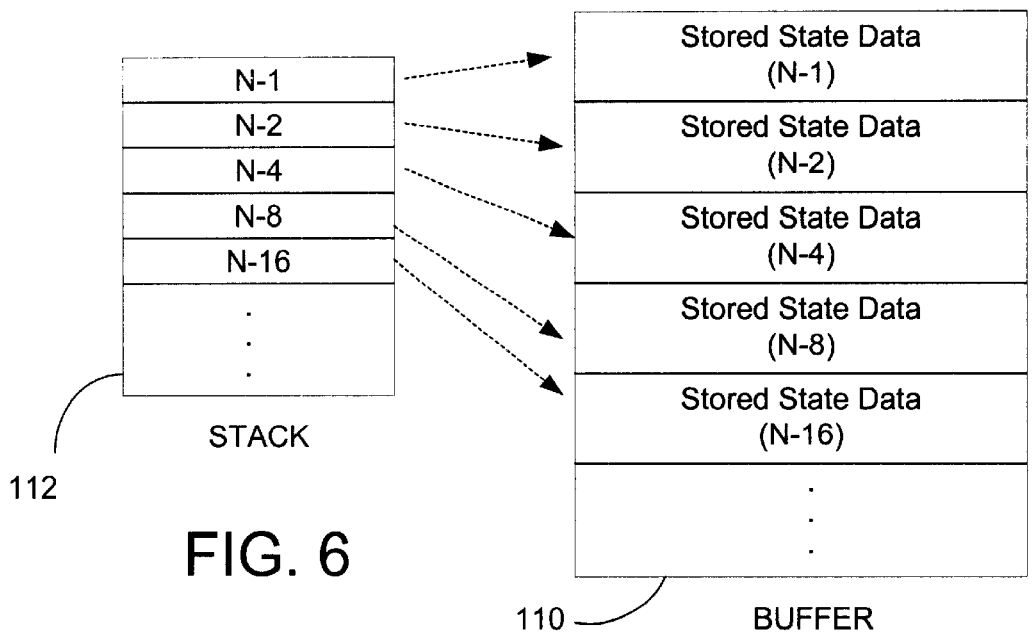
FIG. 6 is a schematic diagram showing a stack and a buffer for storing prior states of a data object for supporting the undoing of multiple editing operations.

In accordance with a feature of a preferred embodiment in the context of applying painting strokes to a digital picture, the stored prior states of the digital picture are spaced apart by intervals that generally increase exponentially with a base of two (2). In accordance with another feature of a preferred embodiment, the list of stored states in the buffer is dynamically updated as new strokes and undo operations are applied to the picture to maintain the general pattern of exponential increase of the intervals between the stored prior states. To that end, the strokes in the editing session are assigned with consecutive stroke numbers, with the first stroke of the session having a stroke number of 0. To facilitate the management of the stored prior states, a stack is used to keep track of which prior states have been stored. Referring to FIG. 6, the state data corresponding to different strokes are stored in a buffer memory 110. The stroke number of each stored prior state is an element of a stack 112. When a prior state of the picture is stored in the buffer, its stroke number is pushed unto the stack. When a stored state is deleted from the buffer, its stroke number is also removed from the stack. The stack is constantly being updated, and the corresponding state data are deleted from or added to the buffer, as new strokes are applied or existing strokes are undone.

Figure 7:
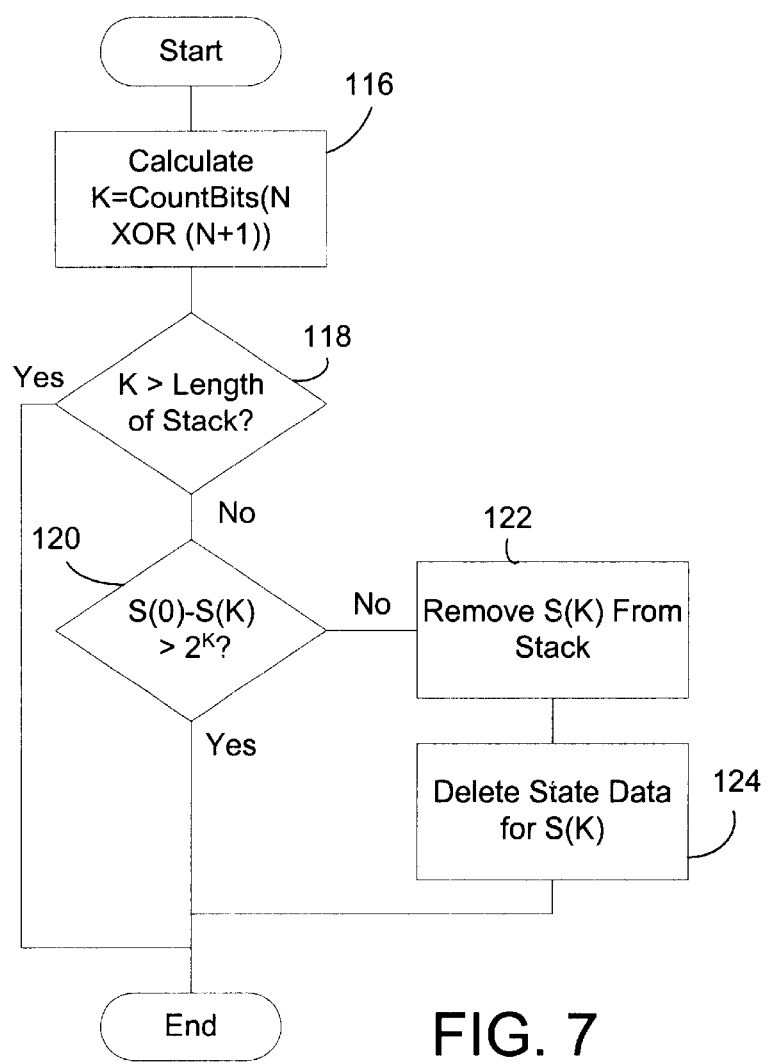
FIG. 7 is a flow chart showing steps of updating a stack of stored prior states according to an embodiment of the invention.

In accordance with a feature of a preferred embodiment, the dynamic management of the stack 110 and buffer 112 is accomplished by using a very simple and efficient method to determine which stored prior state is to be removed from the stack and the buffer. Referring to FIG. 7, if the present stroke number (i.e., the number of the last applied stroke) is N and a new stroke is to be applied, an integer K is calculated as:

$$K=\text{CountBits}(N\ XOR\ (N+1)),$$

where XOR is the "exclusive OR" operator, and CountBits is a function that counts the number of bits in its operand that equal to 1. This CountBits function can be implemented with the following exemplary codes:

```
int CountBits (unsigned int un)
{
  int nBits=0;
  while (un>0) {
    if (un & 0x1) nBits++
    un=un>>1;
  }
  return nBits;
}
```

Referring now to FIG. 7, after the integer K is calculated (step 116), the stack and the state data buffer are undated accordingly. The length of the stack is first compared to the integer K (step 118). If the stack length is smaller than the integer K, the stack and the data state buffer are not modified. On the other hand, if the integer K is smaller than the stack length, the Kth element of the stack is retrieved. The difference between this stack element (s(K)) and the top element (s(O)) of the stack is then compared to the $2^K$ (step 120). If the difference is smaller than $2^K$, then the Kth stack element is removed from the stack (step 122), and the state data corresponding the Kth stack element is deleted from the buffer to free up memory space for storing new state data (step 124). On the other hand, if the difference between the top of the stack and the Kth stack element is greater than $2^K$, then the stack and the buffer are not changed. This comparison step is performed to ensure that no unnecessary deletion of a stored state will occur when that state is already sufficiently far away from the state corresponding to the top of the stack.

Figure 8:
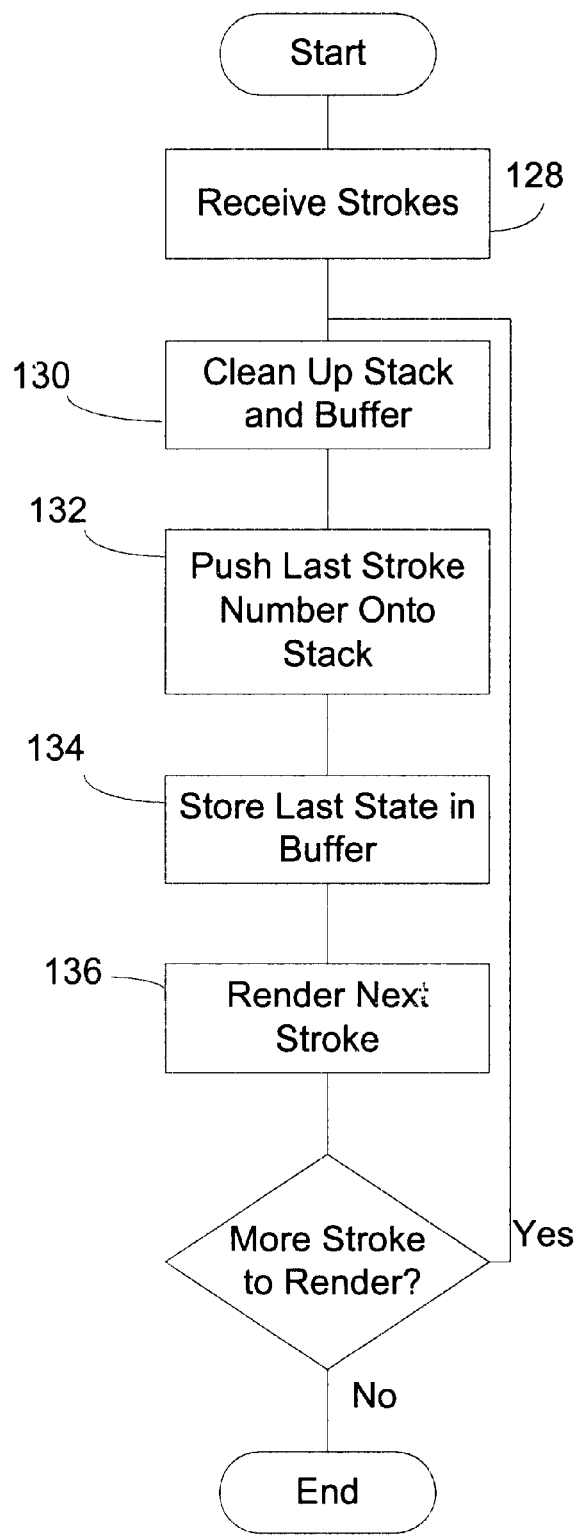
FIG. 8 is a flow chart showing steps of a process of applying painting strokes to a digital picture according to an embodiment of the invention.

The process of updating the stack and state data while applying new strokes is shown in the FIG. 8. In this embodiment, the user may apply a number, "nStrokes," of consecutive strokes. The number nStrokes, of course, may be set to one so that only one stroke will be applied at a time. For each new stroke applied to the digital picture by the user (step 128), the stack and the state data buffer are updated in the way described above (step 130). More particularly, if the stroke number of the last applied stroke is N, then an integer K=CountBits(N XOR (N+1)) is calculated. A decision is then made to determine whether to remove the Kth stack element from the stack and to delete its corresponding state data from the buffer. After the stack and the buffer are updated, the last stroke number, namely N, is pushed onto the stack (step 132), and the state data for the current state are stored in the buffer (step 134). The new stroke with the stroke number of N+1 is then rendered on the digital picture (step 136).

By way of example, FIG. 9 shows a table that illustrated how the stack of stored stroke numbers changes as strokes are applied to a digital picture. In the illustrated example, twenty-one (21) consecutive panting, numbered 0 through 20, have been applied to the digital picture. Each row of the table in FIG. 9 corresponds to a stroke number indicated in the rightmost column and contains the numbers in the stack after that stroke is applied. For example, after stroke number 17 is applied, the stack contains the stroke numbers 16, 14, 12, 8, and 0. The state data corresponding to these stroke numbers are stored in the buffer. When stroke number 18 is applied, K=CountBits(17 XOR 18) is determined to be 2. Accordingly, the second entry on the stack, which is 14, is removed from the stack, and the stored state data for stroke number 14 are deleted from the buffer. The stroke number of the last stroke number, namely 17, is then pushed onto the stack, and the state data for stroke number 17 are stored in the buffer. As a result, the stack after the rendering stroke number 18 contains the stroke numbers 17, 16, 12, 8, and 0.

As can be seen from the table of FIG. 9, updating the stack based on the CountBits(N XOR (N+1)) function produces a stack of stroke numbers separated by uneven intervals that generally increase exponentially with a base of two (2). It will be appreciated that the intervals are not required to follow an exact exponential pattern. Rather, some elements of the exponential sequence may be missing from or repeated in the intervals. For example, the stack for stroke number 19 contains stroke numbers 18, 16, 12, 8, and 0, which are separated by intervals of 2, 4, 4 and 8. The stack for stroke number 20 contains stroke numbers 19, 18, 16, 8, and 0, which are separated by intervals of 1, 2, 8, and 8. Occasionally, the intervals may follow an exact exponential pattern. For instance, after the application of stroke number 16, the stored prior states include states with stroke numbers 15, 14, 12, 8 and 0, which are separated by intervals of 1, 2, 4, and 8, respectively. This example, however, should be understood to be a special case.

A significant advantage of storing prior states at generally exponentially increasing intervals is that relatively few prior states have to be stored to support a reasonable large depth of operation (i.e., the maximum number of consecutive editing operations that can be undone relatively efficiently). In a preferred embodiment where the intervals generally increase exponentially with a base of 2, only about $\log_2(M)$ prior states have to stored to support a depth of undo operation of M. As an example, only about ten prior states have to be stored to support an undo depth of about 1000 strokes. Storing prior states corresponding to strokes separated by generally exponentially increasing intervals strikes a balance between the amount of time it takes to perform the undo operation and the amount of memory required to store the prior states.

Another significant advantage of this generally exponential pattern of intervals between the stored states is that the density of stored states is higher for the more recent states. As a result, the most recent state and the second most recent state of the picture are likely to have been stored in the memory. This emphasis on the more recent states allows the undoing of the most recent several states to be performed quickly.

Figure 10:
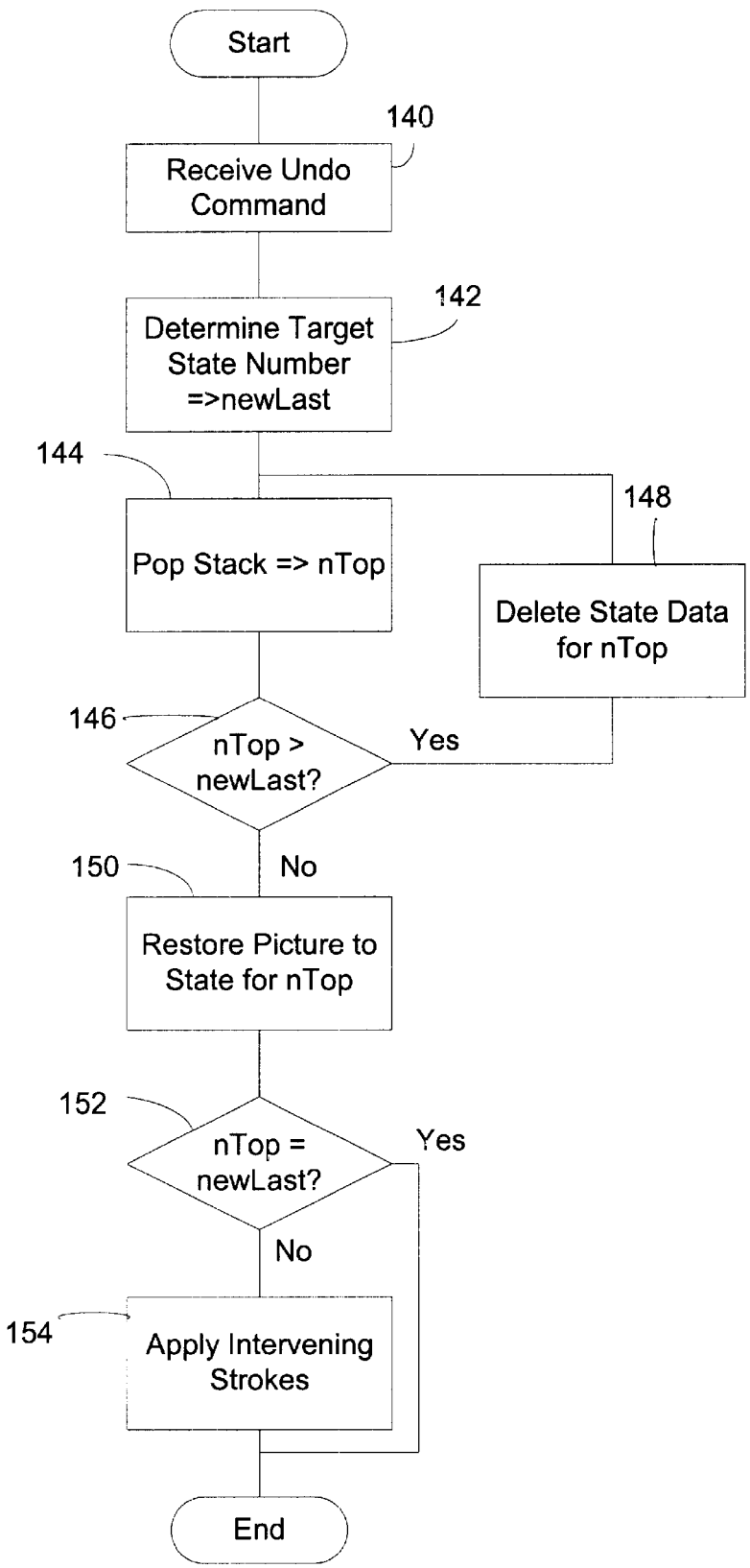
FIG. 10 is a flow chart showing steps of undoing painting strokes applied to a digital picture according to an embodiment of the invention.

The process of undoing multiple strokes in a preferred embodiment is illustrated in FIG. 10. In this embodiment, the user may enter a command to undo a given number, "nUndo," of strokes to be undone at one time. It will be appreciated that the user can choose to undo one stroke at a time by setting nUndo to 1. After receiving the undo command (step 140), the digital painting program determines (step 142) the stroke number of the target state to which the picture is to be restored after the undo operation by calculating:

newLast=LAST−nUndo, where newLast is the stroke number of the target state, and LAST is the current stroke before the undo operation. The top stack element, "nTop," is then popped off the stack (step 144). If nTop is greater than newLast and the stack length is greater than 0 (step 146), the state data in the buffer corresponding to the stroke number nTop are deleted (step 148). The steps of popping the stack and deleting state data from the buffer are repeated until nTop is equal to or smaller than newLast. The picture is then restored to the state corresponding to the stroke number nTop (step 150). If nTop equals to newLast, the undo operation is completed at this moment. If nTop is smaller than newLast (step 152), all previously applied strokes with stroke numbers greater than nTop and up to newLast are applied to the picture (step 154) to regenerate the state of the picture that corresponds to the stroke number newLast.

FIG. 11 shows the evolution of a stack of stroke numbers for a digital picture as the strokes are undone consecutively. Each row in the table contains the numbers in the stack before the corresponding stroke indicated in the right-most column is undone. In this example, the first stroke to be undone is stroke number 20. Because stroke number 19 is already in the stack, the undo operation is performed by simply restoring the picture to the state of stroke number 19 using the corresponding state data in the buffer. As part of the undo operation, the stroke number 19 is popped off the stack, and the corresponding state data in the buffer are deleted. After the stroke number 20 is undone, the undoing of the stroke 19 is likewise straightforward, because the state data for stroke number 18 is already stored in the buffer.

In contrast, the picture cannot be directly restored to its state of stroke number 17, because the state data for that state are not in the buffer. Instead, the picture is first restored to the state of stroke number 16. Stroke number 17 is then applied to the picture. As another example, after stroke 17 is undone, only stroke numbers 8 and 0 remain in the stack. To undo stroke 16, the picture is first restored to the state of stroke number 8, and stroke numbers 9 through 15 are then applied consecutively to the restored picture to bring the picture to the state of stroke number 15.

During the undo operation, as each of the previously applied strokes is reapplied to the picture, the stack is updated according to method described above in conjunction with FIG. 8. As a result, after the undoing of stroke number 16, the state data for strokes 14 and 12 are added to the buffer, and the stack is repopulated to contain stroke numbers 14, 12, 8, and 0.

It will be appreciated that the repopulating of the stack significantly reduces the time required to undo more strokes. For instance, if strokes 15 is to be undone, the picture can be simply restored to the state of stroke 14, which has been stored in the buffer during the undoing of stroke number 16. Due to the repopulating of the stack, relatively few strokes have to be reapplied to undo a reasonably large number of strokes. The left-most column of the table in FIG. 6 shows the number of strokes to be reapplied for the undoing of each stroke. Even for the undoing of 20 consecutive strokes, the total number of strokes to be reapplied is only 25.

In view of the foregoing, it can be appreciated that the present invention provides a method and system for undoing multiple editing operations that can be advantageously used for undoing non-invertable editing operations. In a preferred embodiment, a simple and effective method is provided to manage the stored prior states such that the intervals separating the stored states increase generally exponentially with a base of 2. This method of managing the stored prior states enables multiple-undo operations to be performed reasonably fast, with a reasonably large depth of operation while keep the amount of memory space for storing prior states acceptably small.

What is claimed is:

1. A method of undoing multiple interactive editing operations performed on a data object, comprising the steps of:
   storing a plurality of prior states of the data object, the prior states of the data object being separate from each other and from a current state of the data object and being spaced at uneven intervals and each corresponding to one of previously performed editing operations on the object;
   receiving an instruction to undo an undesired editing operation that has been performed on the data object;
   selecting a stored prior state corresponding to a previously performed editing operation that has been performed before the undesired editing operation;
   restoring the object to the selected stored prior state;
   reapplying on the restored object previously performed editing operations that are subsequent to the selected stored prior state and before the undesired editing operation to return the data object to a state immediately prior to the undesired editing operation.

2. A method as in claim 1, further including the steps of:
   determining, for each next editing operation to be performed, whether to delete a selected one of the stored prior states;
   storing a current state of the data object prior to applying the next editing operation to the data object; and
   applying the next editing operation to the data object.

3. A method as in claim 2, wherein the multiple editing operations are each assigned an operation number, and further including the step of maintaining a stack containing operation numbers of editing operations corresponding to the stored prior states.

4. A method as in claim 3, wherein the step of determining whether to delete includes performing an XOR operation on an operation number of a last performed editing operation to determine which of the stored prior state is to be deleted.

5. A method as in claim 4, wherein the step of determining whether to delete further includes counting a number of "1" bits in a result of the XOR operation as an indicator of which of the stored prior state is to be deleted.

6. A method as in claim 1, wherein the data object is a digital picture.

7. A method as in claim 6, wherein the editing operations include applying painting strokes to the digital picture.

8. A method as in claim 1, wherein the intervals between the editing operations corresponding to the stored prior states increase as said editing operations are further away from a last performed editing operation.

9. A method as in claim 8, wherein the intervals between the editing operations corresponding to the stored prior states increase generally exponentially.

10. A method as in claim 9, wherein the intervals between the editing operations corresponding to the stored states increase generally exponentially with a base of two (2).

11. A method as in claim 10, further including the step of determining whether to delete a selected one of the stored prior states upon performing a new editing operation.

12. A method as in claim 11 wherein the step of determining whether to delete includes performing an XOR operation on an operation number of a last performed editing operation for determining which one of the stored prior states is to be deleted.

13. A method as in claim 12, wherein the step of determining whether to delete further includes counting a number of "1" bits in a result of the XOR operation as an indicator of which of the stored prior state is to be deleted.

14. A computer-readable medium having computer-executable instructions for performing steps comprising:

performing multiple editing operations on a data object;

storing a plurality of prior states of the data object, the prior states of the data object being separate from each other and from a current state of the data object and being spaced at uneven intervals and each corresponding to one of previously performed editing operations on the object;

receiving an instruction to undo an undesired editing operation that has been performed on the data object;

selecting a stored prior state corresponding to a previously performed editing operation that has been performed before the undesired editing operation;

restoring the object to the selected stored prior state;

reapplying on the restored object previously performed editing operations that are subsequent to the selected stored prior state and before the undesired editing operation to return the data object to a state immediately prior to the undesired editing operation.

15. A computer-readable medium as in claim 14, further including computer-executable instructions for performing steps comprising:

receiving a user command to apply a new editing operation to the data object;

deleting a selected one of the stored prior states in response to receiving the user command;

storing a current state of the data object prior to applying the new editing operation to the data object; and applying the new editing operation to the data object.

16. A method of undoing digital painting strokes applied to a digital picture, comprising the steps of:

storing a plurality of prior states of the digital picture, the stored prior states of the data object being separate from each other and from a current state of the data object and each corresponding to one of previously applied painting strokes; the stored prior stats being spaced at pre-selected intervals, the pre-selected intervals increasing generally exponentially with a base of two;

upon receiving an instruction to undo a painting stroke, selecting a stored prior state corresponding to a previously applied painting stroke performed before the painting stroke to be undone;

restoring the digital picture to the selected stored prior state;

reapplying to the restored object previously applied painting strokes that are subsequent to the selected stored prior state and before the painting stroke to be undone.

17. A method as in claim 12, further including the steps of:

determining whether to delete a selected one of the stored prior states in conjunction with applying a next painting stroke to be rendered on the digital picture;

storing a current state of the digital painting prior to applying the painting stroke; and rendering the next painting stroke on the digital picture.

18. A method as in claim 17, wherein the step of determining whether to delete includes performing an XOR operation on a stroke number of a last applied painting stroke to determine which of the stored prior states is to be deleted.

19. A method as in claim 18, wherein the step of determining whether to delete further includes counting a number of "1" bits in a result of the XOR operation as an indicator of which of the stored prior state is to be deleted.

20. A method of undoing multiple editing operations performed on a data object, comprising the steps of:

assigning an operation number to each of said multiple editing operations performed on the data object;

entering a plurality of operation numbers of the multiple editing operations that are spaced at uneven intervals into a stack;

storing a plurality of prior states of the data object, the prior states of the data object being separate from each other and from a current state of the data object and each corresponding to one of the operation numbers in the stack;

receiving an instruction to undo an undesired editing operation that has been performed on the data object, the undesired editing operation having a first operation number;

selecting from the operation numbers entered into the stack a second operation number that is prior to the first operation number;

restoring the data object to a stored prior state corresponding to the second operation number;

when the second operation number is not immediately before the first operation number, sequentially reapplying on the restored object previously performed editing operations having operation numbers between the second and first operation numbers.

* * * * *

UNITED STATES PATENT AND TRADEMARK OFFICE
CERTIFICATE OF CORRECTION

PATENT NO. : 6,527,812 B1
DATED : March 4, 2003
INVENTOR(S) : John Bradstreet

It is certified that error appears in the above-identified patent and that said Letters Patent is hereby corrected as shown below:

Title page,
Item [56], References Cited, U.S. PATENT DOCUMENTS,
The following references should be listed:
-- 5,757,372 5/1998 Krause et al. --
FOREIGN PATENT DOCUMENTS,
-- 8 847 006 EP 6/1998 --
OTHER PUBLICATIONS,
-- Skold et al : "Event sensitive state saving in Time Warp parallel discrete event simulations" 1996 Winter Simulation Conference Proceedings, Coronado, California, USA, December 8-11, 1996, pages 653-660.
Fleishmann et al: "Comparative analysis of periodic state saving techniques in time warp simulators" Proceedings Ninth Workshop on Parallel and Distributed Simulation (ACM/IEEE), Lake Placid, New York, USA, June 14-16, 1995, pages 50-58. --

Column 12,
Line 16, "12" should read -- 16 --.

Signed and Sealed this

Second Day of December, 2003

JAMES E. ROGAN
*Director of the United States Patent and Trademark Office*